Patented July 8, 1930

1,770,153

UNITED STATES PATENT OFFICE

JOSEPH G. DAVIDSON, OF YONKERS, NEW YORK, ASSIGNOR TO CARBIDE AND CARBON CHEMICALS CORP., A CORPORATION OF NEW YORK

COMPOSITION CONTAINING CELLULOSE ESTERS

No Drawing. Original application filed July 20, 1925, Serial No. 44,930. Patent No. 1,633,927, dated June 28, 1927. Divided and this application filed May 31, 1927. Serial No. 195,595.

The present invention comprises compositions containing cellulose esters, together with ethers of polyolefine glycols serving to dissolve or plasticize said cellulose esters.

Polyolefine glycol ethers are described and claimed in Patent No. 1,633,927, issued to me on June 28, 1927, of which the present application is a division.

I have found that the ethers of the polyolefine glycols are in general good solvents and plasticizers for cellulose esters, such as nitrocellulose, the mono-ethers being superior to the di-ethers. Their boiling points range upward from about 190° C. for the monoethyl ether of diethylene glycol. They have valuable properties when used for this purpose in conjunction with a wide variety of other solvents and diluents, as is usually the case in the cellulose ester art, especially in the lacquer art. Valuable solvent and plasticizing mixtures are produced when in the process described in my said Patent No. 1,633,927 for preparing ethers of polyolefine glycols, one or more of the reacting materials is derived from a mixture of olefines and is hence itself a mixture. Thus, instead of using a single olefine oxide, a mixture of olefine oxides may be employed. A mixture of ethers of polyolefine glycols, usually containing other substances, is thus produced. A partial separation of this mixture may be effected or the mixture may be used without separation, according to the purpose for which the product is intended.

I claim:

1. A composition containing a cellulose ester plasticized with a polyolefine glycol ether.

2. A composition containing a cellulose ester plasticized with diethylene glycol monoethyl ether.

In testimony whereof, I affix my signature.

JOSEPH G. DAVIDSON.